(12) United States Patent
de Paoli

(10) Patent No.: US 6,261,672 B1
(45) Date of Patent: Jul. 17, 2001

(54) LAMINATED GLAZING AND ITS MANUFACTURING PROCESS

(75) Inventor: Martial de Paoli, Cuts (FR)

(73) Assignee: Saint-Gobain Vitrage, Courbevoie (FR)

(*) Notice: Subject to any disclaimer, the term of this patent is extended or adjusted under 35 U.S.C. 154(b) by 0 days.

(21) Appl. No.: 09/200,753

(22) Filed: Nov. 30, 1998

(30) Foreign Application Priority Data

Nov. 28, 1997 (FR) .................................................. 97/15023

(51) Int. Cl.[7] ......................................................... B32B 7/02
(52) U.S. Cl. ............................ 428/213; 428/98; 428/192; 428/212; 156/101; 156/252; 156/303.1; 156/513
(58) Field of Search ............................. 428/98, 220, 410, 428/426, 437, 192, 212, 213, 215; 156/101, 252, 303.1, 309.6, 513

(56) References Cited

U.S. PATENT DOCUMENTS 4,704,174 * 11/1987 Valimont et al. .
5,380,575 * 1/1995 Kuster et al. ........................... 428/98

FOREIGN PATENT DOCUMENTS 0 560 639   9/1993  (EP) .
2 612 174   9/1988  (FR) .

* cited by examiner

*Primary Examiner*—Merrick Dixon
(74) *Attorney, Agent, or Firm*—Oblon, Spivak, McClelland, Maier & Neustadt, P.C.

(57) ABSTRACT

A laminated glazing which comprises at least two rigid transparent substrates joined by an interlayer comprising at least one sheet of thermoplastic, the interlayer having at least one cut-out over at least part of its thickness in its marginal part, the cut-out having a hard insert therein.

22 Claims, 3 Drawing Sheets

LAMINATED GLAZING AND ITS MANUFACTURING PROCESS

BACKGROUND OF THE INVENTION

1. Field of the Invention

The present invention relates to a laminated glazing comprising at least two rigid substrates joined by an interlayer comprising at least one sheet of a thermoplastic material, in particular, polyvinyl butyral (PVB) . More particularly, the invention relates to a laminated glazing for use as a sliding side window in the body of a motor vehicle, but it is nevertheless not limited to an application of this kind.

2. Background of the Invention

The side windows of motor vehicles are usually fitted by sliding the glass into the body of the vehicle, generally the doors. In order to be fitted in such a way that it can be moved, the window needs to be positioned in the mechanism by which the window is raised and lowered. This mechanism is referred to as the lifting mechanism.

Known methods of positioning of the type mentioned above may, without implying any limitation, be divided into two categories:

A first method of positioning involves a screw assembly. This method requires the drilling of one or more hole(s) through the window, then screwing two parts which are integral with the lifting mechanism tight against the two faces of the window by means of a screw passing through the hole(s). The second method of positioning is that which is described in EP 0 694 669, and involves assembly by gripping. This is done by making two plates bearing on the outer faces of the windows move towards one another, these plates generally forming part of the same U-shaped piece. Specifically, they are moved towards one another by one or more screws which are tightened with a high torque to ensure effective fastening, more particularly when the window is being lowered into the body. This high torque generates a very sizeable force gripping the outer faces of the windows, equal to at least 120 daN. The degree of the torque employed is dictated by the car companies.

There is an increasing demand from the same automobile manufacturing companies, to improve the performance of side windows of an automobile, especially in terms of acoustic insulation and mechanical strength, in particular resistance to break-ins. These factors contribute to the establishment of standards in force, such as regulation No, 43.

It is moreover known that monolithic glazings provide only minor attenuation of acoustic waves, and that the mechanical strength properties of glass windows are greatly enhanced when the glass is toughened. However, in the particular case of side windows, this mechanical strength should not be too high, because, when it becomes desirable to break the windows, for example in the event of an accident, it prevents rapid breaking and, therefore, impedes the possibility of rapid escape by the occupants of the vehicle.

This is why, in order to reach a satisfactory compromise between the abovementioned required properties, laminated glazings, which include glazings of two glass substrates and which have a differentiated level of toughening either from one substrate to another or over the surface of one or both glass substrates, in particular by making the core tensile stress greater in the marginal region of the glazing, have already been proposed, for example in patents EP 0 418 123 and EP 0 560 639.

In order to manufacture such a laminated glazing, it is necessary either to use a thermoplastic sheet of relatively large thickness and/or complex chemical formulation as an interlayer, or to make adequate use of bending/toughening devices designed for the aforementioned differentiated toughening, devices for which fine tuning may prove difficult. In other words, such manufacturing requirements significantly increase the costs of laminated glazings.

It has been found that laminated glazings prepared from two glass substrates having a low degree of toughening over their entire surface, which is to say the core tensile stresses are less than 35 $MN/m^2$ and which have a thickness $\leq$ 2.1 mm, and are joined together by a "conventional" interlayer such as a sheet of polyvinyl butyral (PVB), results in a perfect compromise between the properties of mechanical strength and acoustic insulation of the glazing which are desired for side windows which slide in the door of a motor vehicle. Such glazings meet standards such as rule No. 43, particularly from the viewpoint of resistance to breaking. What is more, glazings of this type are easy to manufacture using customary manufacturing techniques, which is advantageous from the industrial viewpoint.

It would, therefore, be beneficial, to substitute the latter type of laminated glazing for the optionally laminated toughened glazing mentioned above as side windows in motor vehicles. The problem which results from this substitution is, quite clearly, that of fitting the laminate glazing in question.

It would, therefore, be very beneficial, both in practical and economic terms, to be able to fit such glazings without major modification either to the frame of the side window or to the mechanism for moving it, particularly with respect to the positioning mechanisms mentioned above, since, among other reasons, it would make it possible to have standardized fittings for all the abovementioned side windows for motor vehicles.

Several types of solution may then be envisaged.

A first type consists in employing the screw assembly mentioned above. For this method a drilling step is required. This step may be carried out before or after the glazing has been laminated by the combined effect of a difference in pressure and heat, for example, in an autoclave. The drilling requirement may lead to a problem of matching up the holes. A second possible problem is that it may be difficult to effectively utilize this method because of the very fact that the thickness of the laminated glazing is small.

A second solution employs the gripping assembly mentioned above, wherein the gripping action is exerted on one of the two glass substrates whose dimensions are larger than the other's, as this configuration is described in EP 0 418 123. However, if the gripping assembly is applied to a substrate made of glass having a low degree of toughening with a thickness $\leq$ 2.1 mm by means of the fixed tightening torque, this force will be too strong and the substrate will, therefore, fracture.

A third and last solution involves gripping on the sleeve of a rigid plastic piece extended by a U-shaped end part whose branches are bonded to the laminated glazing using an adhesive. However, as well as the fact that this method dictates a particular geometry for the piece which exerts the gripping, care must be taken, on the one hand, that the area of adhesive provided is sufficient and, on the other hand, that no part of the said plastic piece protrudes into the region of the seal which is referred to as the "weather strip", thereby preventing water from entering between the window and the door of the motor vehicle.

SUMMARY OF THE INVENTION

Accordingly, one object of the present invention is to provide a laminated glazing having improved good properties of sound insulation and mechanical strength over its entire surface and which, in its marginal part, can withstand localized compressive forces leading to its fracture, for example, as a result of it being gripped, the window, in particular, being used as a side window which slides in the body of a motor vehicle and is assembled with the lifting mechanism by gripping.

Another object of the invention is to provide a simple and inexpensive method for manufacturing such a glazing.

Briefly, these objects and other objects of the present invention as hereinafter will become more readily apparent can be attained by a laminated glazing comprising at least two rigid transparent substrates joined by an interlayer comprising at least one sheet of thermoplastic, said interlayer having at least one cut-out over at least part of its thickness(e)in its marginal part, said cut-out having a hard insert therein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
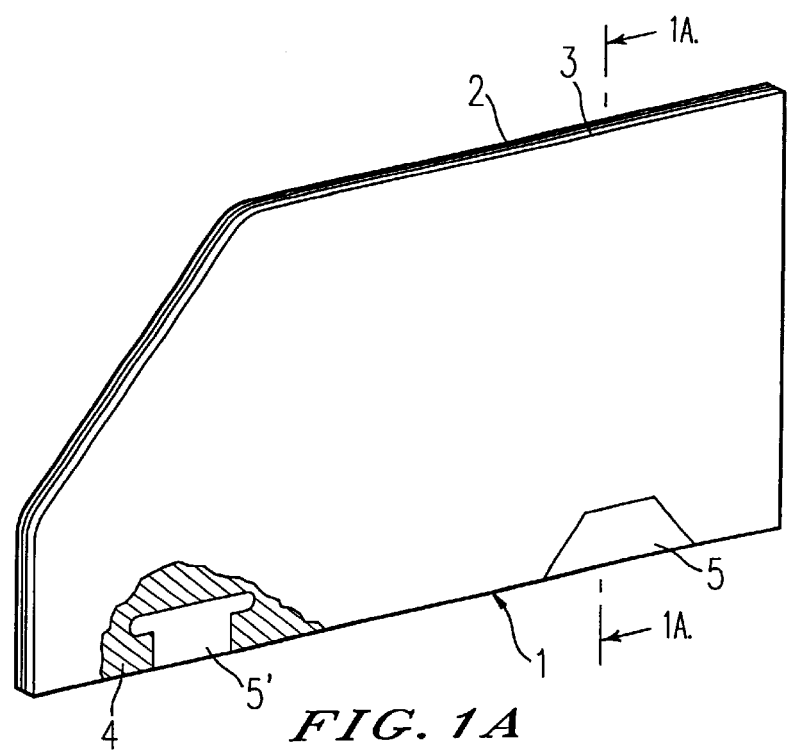
FIGS. 1a and 1b represent a front view and a cross-sectional view along line A—A of FIG. 1, respectively, of the glazing of the invention.

In the context of the invention, the term "hard insert" means a piece which resists the production of an imprint by pressure from an object of a different kind. In the case in point, at least one of the two substrates is at a temperature in a range at which it does not exhibit viscoelastic behavior.

Also in the context of the invention, the hardness of the insert of the invention is in any case greater than that of the interlayer and is less than the minimum hardness of the two rigid substrates.

The solution provided by the present invention has the great advantage that, while fully solving the problem in question, it also provides a significant savings in space in comparison to the solutions afforded by the prior art because, by definition, it does not involve any extra bulk. The direct consequence of this fact, when the present glazing is used as a side window in a motor vehicle, is that it is possible, if need be, to create a local thickening of the window in its lower marginal part and, to a lesser extent, to improve its geometry in the region of the gripping system. Further, there are no problems of adhesive bonding.

A characteristic of the invention is that the interlayer may comprise at least one sheet based on at least one organic polymer, in particular, selected from the group consisting of polyurethane, ethylene-vinyl acetate (EVA), polyvinyl chloride (PVC), a polyester such as polyethylene terephthalate (PET), polycarbonate, polypropylene, polyethylene and polyurethacrylate.

An advantageous property of the present glazing is that it can withstand a force per unit area of at least 2 MPa, applied on either side of the outer faces of the substrates in the region where the insert is located. Here, the surface area of the hard insert is preferably at least equal to the area on which the force is exerted.

Preferably, the hard insert of the invention has a Shore D hardness which limits the hot creep of the sheet of thermoplastic in the region where the insert is located. In the scope of the invention, the term "hot" is intended to mean a temperature above the one at which the sheet of thermoplastic of the interlayer starts to undergo deformation when it is subjected to a permanent compressive force. Also preferably, in the case where the substrates are made of glass which is toughened to a small extent over their entire surface area, the hard insert has a Shore D hardness ranging from 70 to 90, preferably about 80.

Another characteristic of the invention is that when the substrates are made of glass, they may then have a thickness ranging from 1.5 to 2.1 mm.

In a variant of the invention, the hard insert is made of injected, molded or machined plastic. This insert, which may also be a plastic insert filled with fibers and/or beads made of glass, which exhibits improved mechanical strength, is highly advantageous, since it avoids the local creation of scratches in the glass during manufacture of the laminated glazing, which scratches could prove problematic, in particular when fitting the glass to the lifting mechanism. An aspect of the invention is that the hard insert may be made of polyamide or polybutylene terephthalate (PBT).

In fact, generally, the hard insert of the invention may be made of any thermoplastic which may suit the requirements of resisting the crushing caused by the localized compressive forces in the marginal part of the glazing of the invention.

As to the dimensions of the hard insert of the present invention, it has a thickness equal to at least 85% of that (e) of the interlayer, preferably ranging from 0.65 to 0.76 mm. Preferably, the distance separating the "free" edge of the insert from the edge of the assembled rigid substrate which is closest to it is less than 1 mm.

As to shape, the insert and the cut-out may be of complementary shape, preferably allowing them to interlock.

As stated above, the laminated glazing of the invention is used as a window for a motor vehicle, for example, as a side window which moves in the body of the car or as a windscreen. In the latter configuration, the glazing is gripped on one side by the body of the motor vehicle, and on the other side by the ventilation grille of the engine bonnet, through the openings in which the rotation pins of the windscreen wipers pass.

The invention also relates to the laminated glazing described above, in which the outer faces of the substrates are gripped on either side by at least one piece in the region where the hard insert is located, which is noteworthy in that it can withstand the compressive stress caused by the piece.

Advantageously, the piece is a connecting piece which is integral with the mechanism which allows the glazing to move, in particular, the mechanism for raising and lowering a side window which moves in a motor vehicle body. Another characteristic of the glass is that it comprises a pair of plates which move towards one another by at least one tightening screw.

Preferably, the gripping force on the outer faces of the substrates which is exerted by the tightening screw is at least 120 daN.

Lastly, the invention relates to a process for manufacturing laminated glazings comprising two rigid transparent substrates joined by an interlayer which comprises at least one sheet of thermoplastic, in particular polyvinyl butyral (PVB).

In the first step (a) of the process for producing the laminated glazing, at least one cut-out is made over at least a part of its thickness (e) in the marginal part of the interlayer. In the second step (b) a hard insert is accommodated in the cut-out. Step (b) may be conducted during or after having stacked the substrate(s) and the sheet(s) of thermoplastic while adjusting them. Step (b) may also be conducted after having completed lamination of the laminated glazing by the effect of a difference in pressure and/or heat. Similarly, step (b) may be conducted by injecting a liquid material made up of one or two components, preferably which can polymerize without shrinkage.

As to the discussion of the Figures which follow, it should be noted that, for the sake of clarity, the dimensions in all the Figures are not true to scale and do not preserve the relative proportions between the various elements.

FIG. 1a shows laminated glazing 1, having dimensions 0.8 m ×1 m, which forms a motor-vehicle side window consisting of two substrates 2,3 made of clear soda-lime-silica glass with a low degree of toughening, with a thickness equal to 2.1 mm, which are joined by a sheet 4 of polyvinyl butyral PVS with a thickness (e) equal to 0.76 mm once the autoclave lamination cycle has been completed. As will be seen below, this window slides vertically. It is bent to match the profiled shape of the body of a motor vehicle, even though this cannot be seen clearly on reading the very schematic Figures.

In its lower marginal part, this glazing 1 has two inserts 5,5' made of plastic, specifically machined 6,6 polyamide. Each of these inserts 5,5' has a shore D hardness of the order of 80 and a surface area approximately equal to 13.5 cm². The thickness of these inserts 5' is equal to 0.75 mm.

Figure 1B:
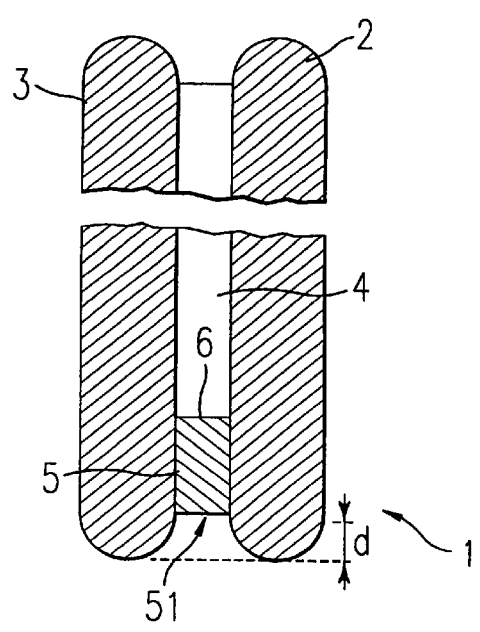

FIG. 1b shows, in a sectional view along the axis A—A, the way in which the insert 5 is arranged in the laminated glazing 1. The insert 5 is accommodated in a cut-out 6 which is made in the PVB sheet 4 and has a substantially complementary shape so that the distance d separating the "free" edge 51 of the insert 5, that is, the edge which is not in contact with sheet 4, from the edge of the glass substrate 4 is less than 1 mm.

The following procedure was adopted to accommodate inserts 5,5' respectively in cut-outs 6,6':
- the cut-out 6 of the trapezoidal cross-section and T-shaped cut-out 6' were made through the entire thickness (e) of the sheet 4 using a cutting blade,
- the substrates 2,3 and the PVB sheet 4 were stacked while adjusting them, and at the same time accommodating the insert 5' in its complementarily shaped cut-out 6',
- a cycle of autoclaving the assembly was conducted to prepare a permanent lamination of the laminated glaring 1,
- then insert 5 was manually fitted into the space defined by the cut-out 6 in such a way that there was no play.

In other words, insert 5' was accommodated concomitantly during the step of stacking the substrates 2,3 and the PVB sheet 4, while insert 5 was accommodated once the permanent lamination of the laminated glazing 1 had been completed.

In order to verify that the laminated glazing 1 formed in this way can withstand the compressive stress caused by a connecting piece integral with the mechanism which allows it to be moved vertically in the door of a motor vehicle, such as the one described in patent EP 694 669, the outer faces of the substrates 2,3 were gripped, in the regions where the inserts 5,5' are located, with the pair of plates of the same piece, which are moved towards one another by a screw on which various tightening torques are exerted, respectively 6.5; 8.5 and 11 N/m, which cause gripping forces of 120, 160 and 200 daN respectively.

Tests were conducted while maintaining these tightening torques for 1000 hours at a temperature of the order of 90° C. In all cases, no fracture of the laminated glazing 1 was found. Furthermore, the thickness of each glazing assembly after the test remained identical, to within one tenth of a millimeter, to that before the test.

Figure 2:
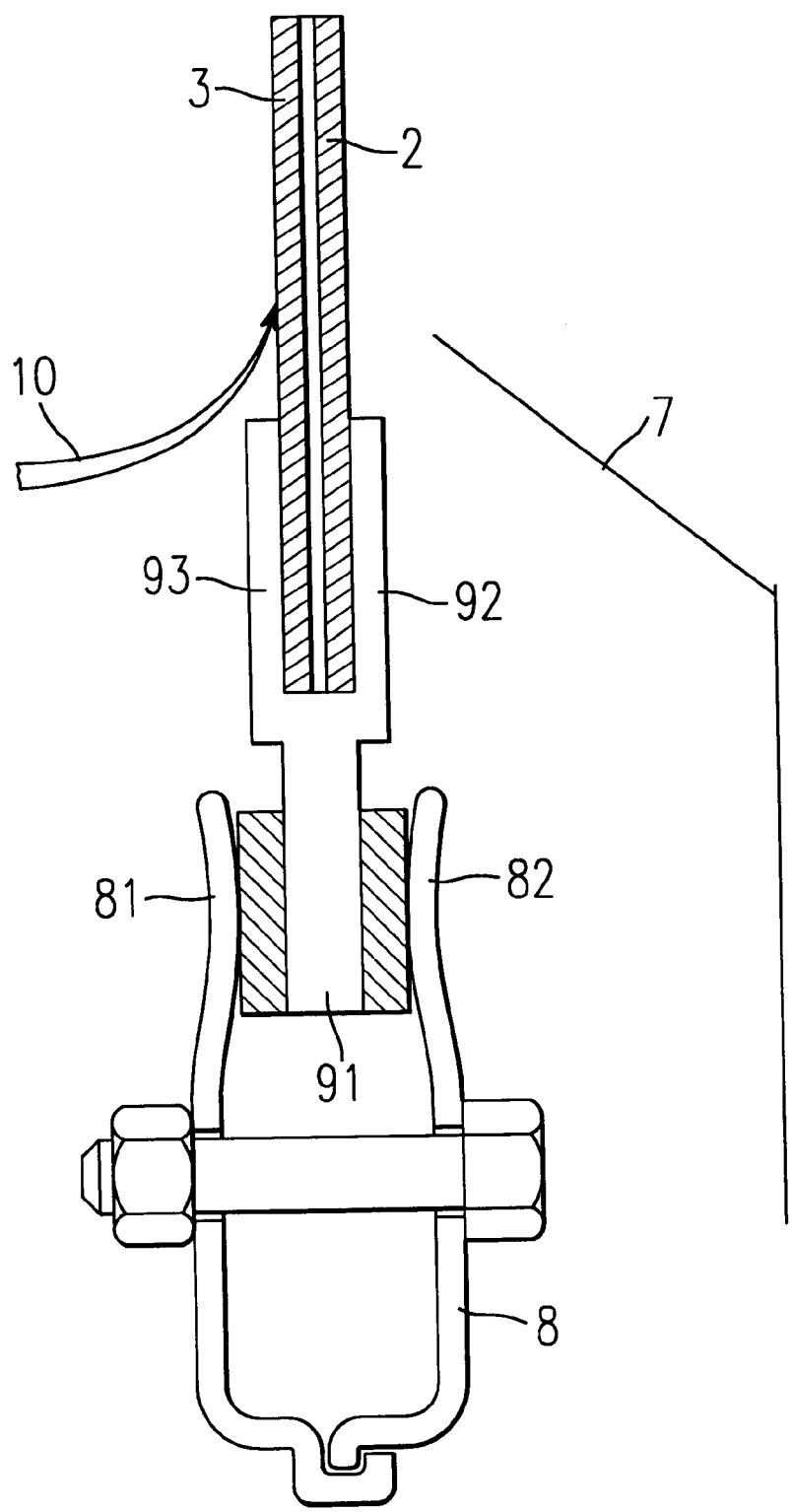
FIG. 2 represents a cross-sectional view of a side window which slides in the door of a motor vehicle and is assembled with the lifting mechanism by gripping as is known in the prior art.
Figure 3:
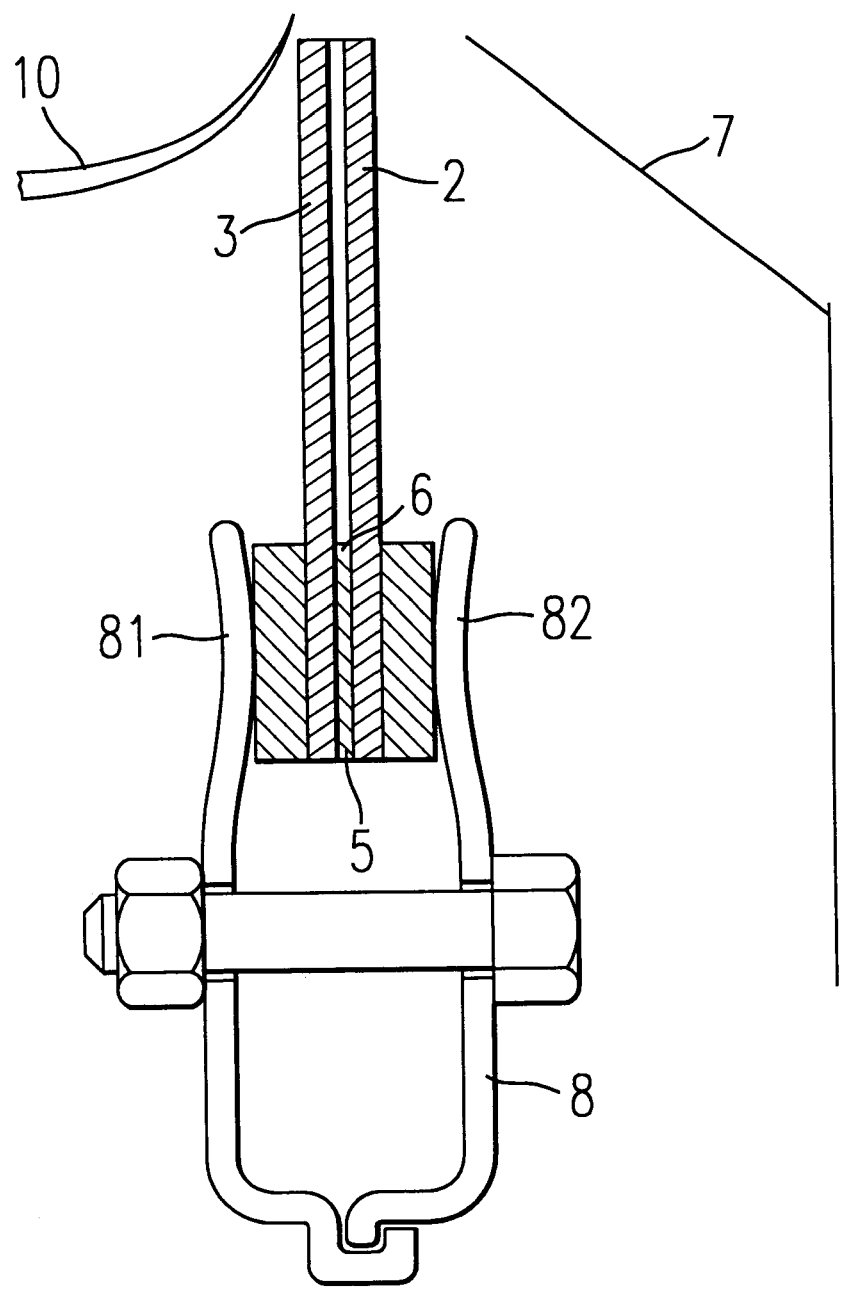
FIG. 3 represents a cross-sectional view of a side window which slides in the door of a motor vehicle and is assembled with the lifting mechanism by gripping according to the invention.

FIGS. 2 and 3 respectively represent a cross-sectional view of a laminated side window which slides in the door of a motor vehicle and is assembled by gripping with the lifting mechanism known to the prior art and known to the invention.

Reference will first be made to FIG. 2, which shows laminated glazing 1 which includes two substrates 2,3 made of glass with a low degree of toughening and is fitted by sliding in the door 7 of a motor vehicle, represented by a broken line, and which is connected to the lifting mechanism by gripping. This is done using a grip 8 including a pair of plates 81, 82 which are tightened by a screw (not shown) on a sleeve 91 whose bearing surface has an area substantially identical to that of the plates 81, 82. This sleeve 91 forms part of rigid plastic piece 9 extended by a U-shaped end part whose branches 92, 93 are bonded to the lower peripheral part of the laminated glazing 1 by means of an adhesive.

Reference will now be made to FIG. 3, which shows laminated glazing 1 of the invention, such as the one represented in FIGS. 1a and 1b which is fitted in similar fashion to the one in FIG. 2. Connection with the lifting mechanism is again provided by gripping using the same grip 8, with the exception that it no longer takes place via sleeve 91 of the piece 9 in the previous Figure but directly on the outer faces of the glass substrates 2,3 with a low degree of toughening, in the region where the hard insert 5 described above is located.

The advantage of the solution of the invention over the one proposed in FIG. 2 is undeniable. In addition to greater compactness, the invention makes it possible to circumvent any problem of adhesive bonding and of any piece other than the laminated glazing 1 protruding into the region of the seal 10 known as the "weather strip".

Obviously, numerous modifications and variations of the present invention are possible in light of the above teachings. It is, therefore, to be understood that within the scope of the appended claims, the invention may be practiced otherwise than as specifically described herein.

What is claimed as new and is intended to be secured by Letters Patent is:

1. A laminated glazing, comprising at least two rigid transparent substrates joined by an interlayer comprising at least one sheet of thermoplastic, said interlayer having at least one cut-out over at least part of its thickness in a marginal part thereof, said cut-out having a hard insert therein, said hard insert having a hardness which is greater than that of the interlayer, and less than a minimum hardness of the two rigid substrates.

2. The glazing of claim 1, wherein the interlayer comprises at least one sheet based on at least one organic polymer selected from the group consisting of polyurethane, ethylene-vinyl acetate (EVA), polyvinyl chloride (PVC), a polyester, a polycarbonate, polypropylene, polyethylene and polyurethacrylate.

3. The glazing of claim 1, wherein the glazing withstands a force per unit area of at least 2 MPa, applied on either side of the outer faces of the substrates in the region where the insert is located.

4. The glazing of claim 3, wherein the surface area of the insert is at least equal to the area on which said force is exerted.

5. The glazing of claim 1, wherein the hard insert has a Shore D hardness which limits the hot creep of said sheet of thermoplastic in the region where the insert is located.

6. The glazing of claim 1, wherein the substrates are made of glass which is toughened to a small extent over their entire surface area, and wherein the hard insert has a Shore hardness ranging from 70 to 90.

7. The glazing of claim 6, wherein the glass substrates have a thickness ranging from 1.5 to 2.1 mm.

8. The glazing of claim 1, wherein the hard insert is made of injected, molded or machined plastic filled with glass fiber, glass beads or combinations thereof.

9. The glazing of claim 8, wherein the hard insert is made of polyamide or polybutylene terephthalate (PBT).

10. The glazing of claim 1, wherein the hard insert has a thickness equal to at least 85% of that of the interlayer.

11. The glazing of claim 9, wherein the thickness of the hard insert ranges from 0.65 to 0.76 mm.

12. The glazing of claim 1, wherein a distance separating a free edge of the insert from an edge of the assembled rigid substrate which is closest to it is less than 1 mm.

13. The glazing of claim 1, wherein the insert and the cut-out are of complementary shapes which allow them to interlock.

14. The glazing of claim 1, wherein the glazing is a side window for a motor vehicle which can move in the body of a car or is a windscreen.

15. The glazing of claim 1, wherein the outer faces of the substrates are gripped on either side by at least one piece in a region where the hard insert is located, the glazing being able to withstand the compressive stress caused by the piece.

16. The glazing of claim 15, wherein the piece is a connecting piece integral with a mechanism which allows the glazing to raise and lower as a side window in a motor vehicle body.

17. The glazing of claim 15, wherein the piece comprises a pair of plates which are moved towards one another by at least one tightening screw.

18. The glazing of claim 17, wherein a gripping force on the outer faces of the substrates exerted by the tightening screw is at least 120 daN.

19. The process of claim 1, wherein step (b) is conducted after having completed lamination of the laminated glazing by subjecting the laminate to a difference in pressure or heat or both.

20. The process of claim 19, wherein step (b) is conducted by injecting a liquid material made up of one or two components which polymerize without shrinkage to form the hard insert.

21. A process for manufacturing a laminated glazing comprising two rigid transparent substrates joined by an interlayer of thermoplastic, comprising:
 a) placing at least one cut-out over at least a part of a thickness of the laminated glazing in a marginal part of the interlayer; and
 b) positioning a hard insert in the cut-out, said hard insert having a hardness which is greater than that of the interlayer, and less than a minimum hardness of the two rigid substrates.

22. The process of claim 21, which comprises, in that step b), conducting, during or after having stacked the substrate (s), and the sheet(s) of thermoplastic while adjusting them.

* * * * *